Feb. 17, 1953 A. H. PERSOON ET AL 2,628,929
METHOD AND APPARATUS FOR TRANSFERRING
A MAGNETIC SOUND TRACK TO MOVIE FILM
Filed July 15, 1949 2 SHEETS—SHEET 1

Inventors
Andrew H. Persoon
Chester F. Stebbins
By Carpenter, Abbott, Coulter & Kinney
Attorneys Inventors
Andrew H. Persoon
Chester F. Stebbins
By Carpenter, Abbott, Coulter & Kinney
Attorneys Patented Feb. 17, 1953 2,628,929

UNITED STATES PATENT OFFICE 2,628,929

METHOD AND APPARATUS FOR TRANSFERRING A MAGNETIC SOUND TRACK TO MOVIE FILM

Andrew H. Persoon, St. Paul, and Chester F. Stebbins, Minneapolis, Minn., assignors to Minnesota Mining & Manufacturing Company, St. Paul, Minn., a corporation of Delaware Application July 15, 1949, Serial No. 104,926

5 Claims. (Cl. 154—97.5)

This invention relates to motion picture film having a magnetic sound track coated thereon and also to methods of, and apparatus for, applying the sound track, in the form of a thin layer of permanent magnetic material, on one edge portion of the movie film, preferably between an edge and the adjacent sprocket holes.

Sound movies have usually been made by storing sound on an optical sound track comprising a photographic emulsion. As is well known, the use of optical sound tracks has been widely accepted for professional recording on movie film. Its use by non-professional camera-men has been very limited, probably due to the cost of the apparatus required for storing and reproducing sound on an optical track. A particular object of the present invention is the provision of apparatus for the application of sound to home movies, particularly in the form of a magnetic sound track coated between the edge and the adjacent sprocket holes of 8 mm. and 16 mm. movie film. It is to be understood that the invention is not limited to use upon 8 or 16 mm. movie film but may be likewise successfully applied upon 35 mm. etc., motion picture film; however, it is believed that the invention will find its most widespread and early utilization in the home movie field aforesaid.

It has been suggested that movie film can be provided with a magnetic sound track by directly coating permanent magnetic particles dispersed in a suitable binder upon the edge or the entire surface of the movie film by direct coating methods such as knife coating or roller coating. The difficulty with such suggestions largely arises from the fact that both the thickness and width of the desired magnetic sound track is quite small, i. e. in home movie films the width of the sound track covering the area between the sprocket holes and the adjacent edge of the film does not exceed 0.036 inch and the thickness of the track should not exceed 0.0007 inch. The difficulty of controlling the width and thickness of the magnetic track within precise requirements, by direct coating, is readily apparent.

By the method herein to be described, the foregoing objections to a magnetic sound track applied by direct coating methods are largely overcome and the permanent magnetic particles may be uniformly and evenly distributed in a thin track along the edge of the movie film.

Sound is recorded on the coated movie film as the film is pulled past a magnetic head, which forms a part of a recording circuit, where it is subjected to a fluctuating magnetic field. The fluctuations are set up by the incoming signal and a magnetic record of the signal is thus impressed on the coated edge of the movie film. When the film is subsequently pulled past a similar magnetic head connected in a reproducing circuit, the original signal is regenerated in that circuit. The magnetic reproducing circuit is synchronized with the film projector and preferably forms a part of the projector.

An object of the invention is to provide a method and apparatus in which permanent magnetic particles can be distributed in a thin track on the edge of movie film with considerable uniformity and evenness. As a result, a sound track having improved magnetic properties, in such important respects as stronger signal and higher signal to noise ratio, may be obtained. Another object of the invention is to provide a method of coating a magnetic sound track upon movie film which is more convenient and quicker than those now in use. For example, it is contemplated, particularly for home movies, that the magnetic track may be applied to the movie film edge after the film has been exposed and developed; however, cameras are being developed which will magnetically record sound at the time the film is exposed.

In brief, the invention contemplates securing permanent magnetic particles, such as iron oxide particles, to an edge portion of movie film by adhering them to a temporary carrier ribbon; coating a permanent binder above the layer of magnetic particles; positioning the carrier ribbon and the motion picture film of cellulose acetate so that the thin layer of magnetic particles is brought into alignment with the edge portion of the motion picture film; heating and/or pressing the aligned members while maintaining the support and the motion picture film in such relative position until the binder has set sufficiently to hold the magnetic particles to the edge of the motion picture film upon removal of the temporary support; and then removing the temporary support. The coated track thus has a very smooth surface, which is of considerable importance in reducing background noise in the reproduced signals.

The invention will be more fully understood in connection with the following description and the accompanying drawings which set forth in detail one approved method of, and apparatus for, carrying out the invention. In the drawings.

Figure 1:
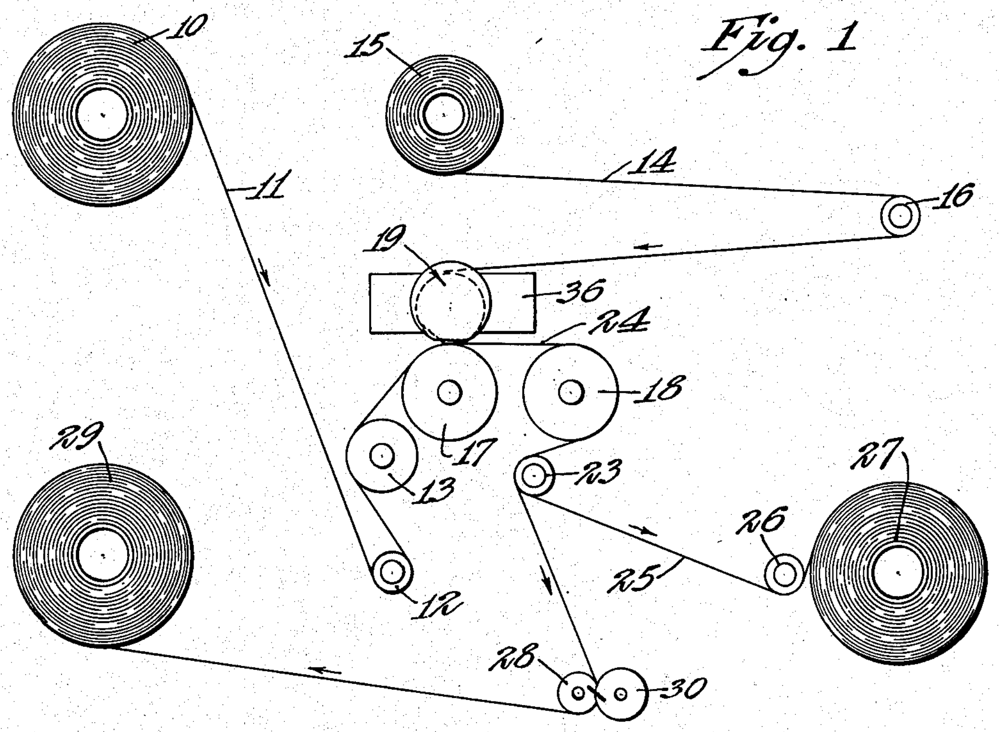
Fig. 1 is a diagrammatic view of apparatus which may be used to carry out the invention.

Before describing the carrier ribbon from which magnetic particles are transferred to the edge of the movie film, reference will first be made to the complete apparatus, as diagrammatically shown in Fig. 1 of the drawing. In the drawings the reference character 10 indicates a supply reel from which motion picture film 11, having the customary sprocket holes 35 spaced from the edges thereof, is led around guide rolls 12 and 13 to the transfer units shown in Figs. 2 and 3. A carrier ribbon 14, comprising a thin flexible backing 25, a layer 33 of magnetic particles dispersed in a binder, and an outer adhesive layer 34, is mounted on supply reel 15 and the ribbon passes around guide roll 16 before reaching the transfer units in a substantially horizontal flight from the guide roll 16. The supply reels 10 and 15 for the motion picture film 11 and carrier ribbon 14, respectively, are maintained under sufficient restraining tension to maintain smoothness of movement of the film and ribbon and to keep them taut. Suitable means, not shown in the drawing, are provided to drive the movie film 11 and carrier ribbon 14 at controlled speed in the direction indicated.

The transfer unit comprises horizontally spaced rolls 17 and 18 and a heated shoe 19 fixedly mounted above the roll 17 with their peripheries in substantial contact, as in the impression and plate cylinders of a rotary printing press. In this manner the motion picture film 11 and the carrier ribbon 14 are pressed together as they pass between the shoe 19 and roll 17. If desired, the heated shoe 19 may be rotatably mounted. However, most satisfactory results have been obtained with the heating element fixedly mounted, in that in this manner an ironing effect is obtained which reduces the tendency to trap bubbles between the magnetic oxide layer and movie film. The shoe 19 is provided with suitable heating means 36 which may comprise electrical resistance units or steam or hot oil units, etc. (not shown in detail).

Figure 2:
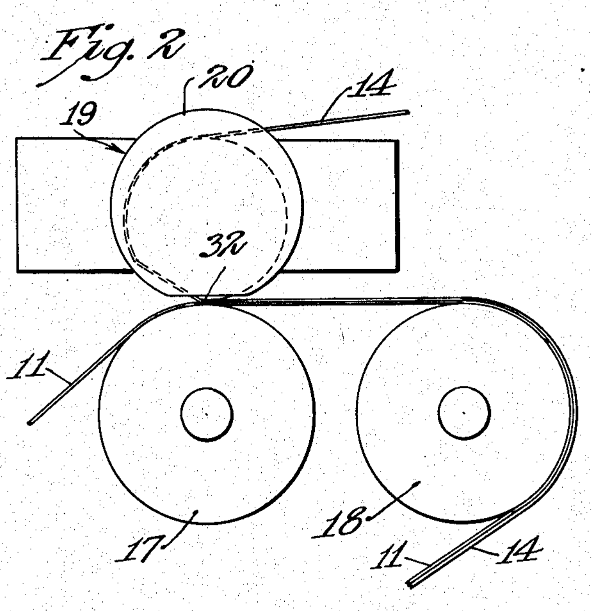
Fig. 2 is an enlarged, front elevation of a portion of the apparatus shown in Fig. 1 for transferring the magnetic material from a temporary carrier ribbon to the motion picture film.
Figure 3:
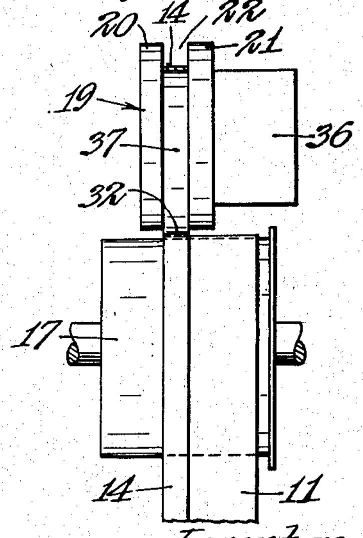
Fig. 3 is an end elevation of the apparatus shown in Fig. 2.
Figure 6:
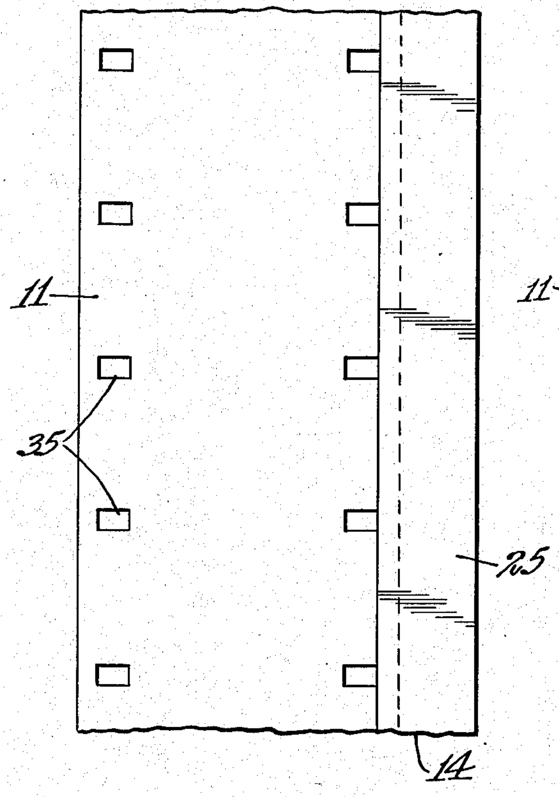
Figs. 6 and 7 are, respectively, plan and sectional views of movie film and a carrier ribbon temporarily laminated to an edge of the film.
Figure 7:
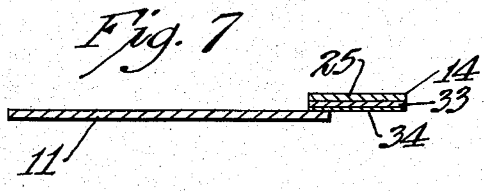

The construction of the transfer unit is shown in greater detail in Figs. 2 and 3 where it may be seen that the shoe 19 comprises substantially cylindrical members 20 and 21, spaced apart to provide, intermediate thereto, a channel 22. The channel lies between members 20 and 21 and above the guide member 37 which is of substantially the same width as the carrier ribbon 14, adapted to be drawn thereover. The guide member 37 is offset and flattened at its lower portion 32. The ribbon 14 is heated as it passes around the shoe in its channel 22 and the outer adhesive layer 34 is softened and rendered tacky so that it will adhere firmly to the movie film. As the ribbon 14, with its permanent magnetic particles facing outwardly approaches the bottom of the shoe 19, one edge portion of the ribbon is in alignment with the edge portion of the movie film extending beyond the sprocket holes 35 of the film. The angle at which the film and carrier ribbon are brought together may be as great as desirable to eliminate the entrapment of air. Both members are moving at the same speed at the point of contact. As the motion picture film 11 passes over the roll 17 its emulsion-coated surface is disposed inwardly and thus the lamination shown in Figs. 6 and 7 is formed on the uncoated surface of the film.

The motion picture film 11 and the magnetically coated ribbon 14, after thus being pressed together between the combining roll 17 and flat portion 32 of heated shoe 19, are drawn therefrom as a double web 24 around the guide roll 18 and the fly roll 23.

As shown in Fig. 1, the lamination 24 of the carrier ribbon 14 and motion picture film 11 is drawn in a substantial horizontal direction to and around the guide drum 18 in order that the binder element on the surface of the temporary support 14 may be in close contact with the edge portion of the cellulose acetate motion picture film. By the time the lamination has passed the fly roll 23 the adhesive layer 34 of the temporary support will have acquired a preliminary set on the edge portion of the movie film (to which it has a greater adherence than the binder for the magnetic particles has to the backing of the temporary support). The backing layer 25 of the temporary support 14 is separated from the lamination 24 after the lamination passes the fly roll 23 and is drawn around guide roll 26 and wound upon take-up reel 27. (Guide rolls 12 and 26 may be omitted from the apparatus shown in Fig. 1.)

Figure 8:
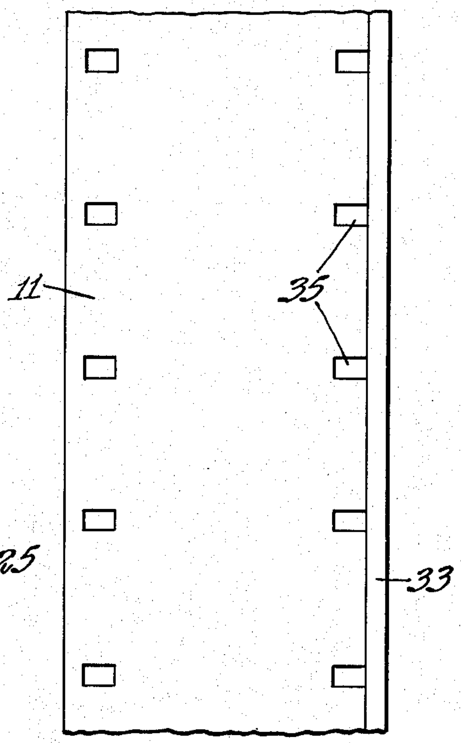
Figs. 8 and 9 are, respectively, plan and sectional views of movie film with a magnetic sound track applied to one edge thereof, in accordance with the present invention.
Figure 9:
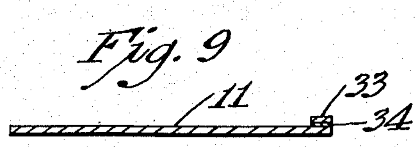

The motion picture film having a track of permanent magnetic particles coated between one of its edges and the sprocket holes, as shown in Figs. 8 and 9, is then drawn around guide roll 28 and wound on take-up reel 29.

Figure 4:
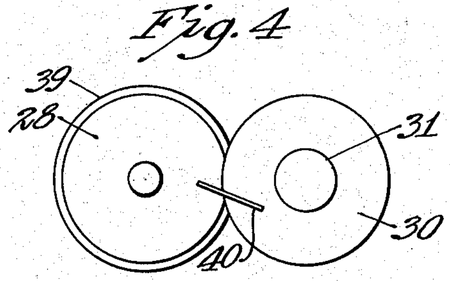
Figs. 4 and 5 are, respectively, front elevational and plan views of a device for trimming away magnetic material which overlaps the edge of the motion picture film.
Figure 5:
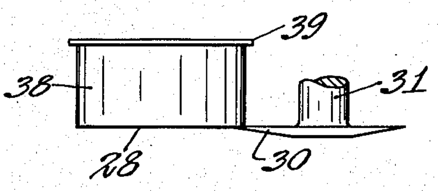

As best shown in Figs. 4 and 5 the guide roll 28 has a peripheral channel 38 of the same width as the width of motion picture film and is provided with flange 39 to retain the film on the roll. Positioned adjacent to the outside edge of the periphery of the driven roll 28 is a rotary cutter knife 30, mounted on shaft 31, and adapted to trim any of the transferred magnetic dispersion which may extend beyond the edge of the movie film. The cutter knife 30 may also be provided with a doctor blade 40 adapted to remove binder and magnetic particles from the edge of the cutter blade 30.

As shown in Figs. 6 and 7 the carrier ribbon comprises a flexible film backing 25, a thin coating 33 of a dispersion of permanent magnetic material and binder on one surface of the backing, and an adhesive layer 34 superimposed on the coating of binder and particles. The backing 25 of the carrier ribbon 14 preferably comprises cellophane, although other flexible sheet materials, metal foil, glassine paper, other cellulosic derivatives or resinous films may be used. An important property of the backing material is that it has a low degree of adhesion to the binder employed in the dispersion of magnetic particles coated thereon, and thus may be readily stripped from the layer of binder and magnetic particles, after the carrier ribbon has been laminated to the movie film.

The permanent magnetic particles preferably comprise paramagnetic iron oxide, such as gamma red iron oxide or black $Fe_3O_4$ particles. The particles are preferably, but not necessarily, of an acicular shape.

The iron oxide particles may be applied to the cellophane backing in a coating consisting of two parts by weight of iron oxide powder uniformly dispersed in and bonded with, a binder composition of rubbery material which is quite elastic, and remains hard and tough as a smooth and continuous film under the conditions of use in a movie projector. Satisfactory results have been obtained by the use of a binder comprising a high molecular weight vinyl resin polymer which has been plasticized and modified with a lesser proportion of a compatible rubbery butadiene-acrylonitrile polymer. The dispersion of binder and iron oxide particles is applied in a volatile organic solvent, which is then volatilized and removed, leaving approximately 6–7 grains of dry coating per 24 square inches. The vinyl polymer may be a copolymer of 90 parts of vinyl chloride and 10 parts of vinyl acetate, and the rubbery polymer may be a copolymer of 65 parts of butadiene-1,3 and 35 parts of acrylonitrile.

Satisfactory results have also been obtained with a dispersion of iron oxide particles in which the binder comprises polymers including an acrylate monomer such as ethyl arcylate-methyl methacrylate copolymer. The latter binder is not as elastic as the rubbery binder first mentioned and it also has a slightly higher adhesion to cellophane, but in other respects it is quite satisfactory in forming the binder component of the iron oxide dispersion.

These binders are characterized by high dimensional stability, excellent aging characteristics and high resistance to loss of magnetic particles.

Cellulosic derivatives such as cellulose nitrate, which are necessarily plasticized with materials such as dibutyl phthalate in order to prevent brittleness, may also be employed as the binder for the magnetic particles but in general have not been found to be as successful as the rubbery polymers previously mentioned. For example, the plasticizer has been found under certain test conditions to migrate slowly into the film backing, thus softening the backing and rendering it more easily stretchable. Cellulose nitrate is also known to deteriorate on prolonged storage particularly at elevated temperatures. Plasticized polyvinyl acetate may also be used as the binder. It cannot be loaded with as high a magnetic oxide volume as can the more rubbery polymers. A maximum amount of oxide content in the coating on the narrow edge of the movie film is highly desirable in order to secure most effective reproduction of signals to be recorded. For that reason rubbery polymers of the types mentioned are preferred as the binder for the magnetic material.

Superimposed on the layer 33 of magnetic particles and binder is a uniform coating 34 of an adhesive adapted to secure the layer 33 to the edge of motion picture film, as shown in Figs. 6–9. Such adhesives must have good bonding properties to cellulose acetate, as most motion picture film is formed of cellulose acetate. The adhesive should also form a secure bond with the binder of layer 33 in order that portions of the magnetic layer will not remain on the temporary cellophane backing 25 after the carrier ribbon 14 and motion picture film 11 have passed through the transfer apparatus shown in Fig. 1. It is highly important that a continuous and even layer of magnetic particles be deposited upon the edge of the motion picture film during the transfer step; otherwise some of the signals will not be recorded on the motion picture film.

The uppermost layer 34 of the transfer ribbon 14 preferably comprises a heat-sensitive adhesive such as a polymethyl acrylate, a vinyl acetate adhesive, a vinyl acetate-butyl acrylate adhesive or a wax-rubber adhesive. Highly satisfactory results have been obtained using a polymethyl acrylate heat-sensitive adhesive comprising 65 parts by weight of methyl ethyl ketone, 35 parts distilled methyl acrylate monomer and 0.2 part benzoyl peroxide. The components are polymerized for several hours and then additional monomer is added and the polymerization continued. This procedure is repeated until a solids content of 45 to 50% is obtained. The adhesive is coated upon the transfer ribbon in a thin layer of approximately 3–4 grains of dry coating per 24 square inches.

Another suitable heat-sensitive adhesive comprises 70 parts of polyvinyl acetate and 30 parts of n-butyl acrylate polymerized in toluene at 60% solids.

A dispersion of polyvinyl acetate beads and dichlorinated diphenol in toluene and ethanol may also be used as the heat-sensitive adhesive layer 34. This dispersion includes 75 parts of polyvinyl acetate beads, 25 parts of liquid chlorinated diphenol (sold as Aroclor No. 1248 by Monsanto Chemical Company), 58 parts of ethanol and 175 parts of toluene.

Pressure-sensitive adhesives such as a phenolic-acrylate adhesive, rubber cements, may also be employed as the outermost coating layer 34 of the temporary ribbon.

A suitable pressure-sensitive adhesive comprises 100 parts of a cross-linked emulsion polymer of 75% ethyl butyl acrylate and 25% ethyl acrylate, 5 parts of para-tertiary-amyl-phenol-formaldehyde resin, 1 part salicylic acid, 3 parts zirex resin, 268 parts heptane and 8 parts ethanol. It is coated upon the carrier ribbon in a thin layer of approximately 3–4 grains of dry coating per 24 square inches.

When pressure-sensitive adhesives are employed the apparatus shown in Figure 1 is modified to substitute a treated rubber roll for the heated shoe 19.

When certain adhesives, particularly the pressure-sensitive types of adhesives, are employed as the outermost layer 34, it is advantageous to apply a thin coating of a low adhesion size to the uncoated surface of the cellophane backing 25 of the transfer ribbon in order to prevent "blocking" of the convolutions of the transfer ribbon 14 when it is wound upon a reel. The backsize is also recommended when the outer layer 34 is a heat-activatable adhesive. The backsize may comprise a micro-thin coating of a low-adhesion polymeric compound, such as cellulose tristearate, tripalmitate or trilaurate and will provide the back surface with an adherency to the pressure-sensitive adhesive which is less than that of cellulose acetate or cellophane.

The laminating tape comprising cellophane backing 25, the layer 33 of a dispersion of magnetic iron oxide particles and binder and the adhesive layer 34 may be coated on the cellophane backing of several inches in width. The laminating tape is then slit in widths of approximately a quarter of an inch before it is wound upon reels 15 for use in the transfer apparatus of Fig. 1. The ribbons are wound on the reel 15 with the adhesive coated surface outermost. The heat-sensitive adhesive is softened as the ribbon is drawn over the heated shoe 19 and the adhesive is in a tacky condition as it is brought into contact with the edge of the movie film as the film and ribbon are drawn between the heated shoe 19 and the roller 17. The adhesive has a high bonding value to the cellulose acetate movie film and is firmly united thereto as the laminated ribbon and motion picture film are drawn around the rollers 18 and 23. The cellophane backing 25 of the temporary ribbon may then be stripped from the lamination and the magnetic layer 33 breaks cleanly away from the cellophane backing and is firmly adhered to the edge of the movie film by the adhesive 34, as shown in Fig. 9.

The shoe 19 may be heated within the temperature range of 140° C. to 180° C. and the transfer ribbon 14 and the motion picture film 11 are drawn through the transfer apparatus of Fig. 1 at the same speed, which may range from 25 feet per minute to 120 feet per minute. If higher temperatures are used, it is generally necessary to increase the speed of the ribbon and film and to reduce the tension on the movie film and the transfer ribbon in order to prevent distortion of the movie film. At speeds higher than 120 feet per minute, it is more difficult to control the exact alignment of the transfer ribbon on the edge of the motion picture film than at slower speeds.

Since only a longitudinal strip of the coated material on one side of the quarter-inch width ribbon is transferred to the motion picture film edge during one travel of the transfer ribbon 14 through the transfer apparatus, the ribbon may be reused such that the unstripped, coated portion of the ribbon is brought into contact with the edge of the motion picture film on a second run through the apparatus. Thus on 8 mm. film the width of the sound track, applied between the sprocket holes and edge of the film, may be approximately 0.036 inch, while on 16 mm. film it is possible to apply a 0.108 inch wide magnetic track over the area on which an optical sound track is presently applied. The cutter edge 30 removes any overhanging portions of magnetic material from the edge of the motion picture film before it is wound on the reel 29.

In some cases as when binders for the magnetic particles are employed that are less elastic than the modified vinyl resin adhesive or acrylate binders herein described, it is necessary to modify the apparatus shown in Fig. 1. In such cases the cellophane backing does not break cleanly away from the layer of magnetic particles and binder and it is desirable to trim off the excess, unlaminated portion of the transfer ribbon, which is wound up for reuse. The movie film with the narrow strip of transfer ribbon attached to it is then exposed to an atmosphere of high humidity at 150° F. for 5 minutes to loosen the bond between the cellophane backing and the magnetic oxide layer. The narrow strip of cellophane may then be removed by a rewind operation.

The method of operation of our improved apparatus is self-evident from the above description. An outstanding feature of the invention is the simplicity by which we are able to apply a continuous and uniform magnetic coating to motion picture film.

In order to eliminate the thicker area caused by the application of the magnetic track on one side of the movie film, and to obtain coated film of uniform thickness, the portion of the film, on which the magnetic track is to be applied, may be skived to a depth of 0.0007 inch before the magnetic track is transferred thereon in the manner described.

Motion picture film, provided with a magnetically active coating comprising ferromagnetic particles uniformly distributed in a binder, in the manner described, remains flexible and readily winds upon and unwinds from reels. When the binder is formed of the acrylate polymers or vinyl polymers modified by a compatible rubbery polymer as herein described, the movie film does not lose magnetic material by flaking and has high dimensional stability.

The transfer ribbon disclosed herein is also disclosed and is claimed in a divisional application Serial No. 154,383, filed April 6, 1950.

What we claim is:

1. A method of coating magnetic particles on motion picture film, adjacent an edge thereof from a transfer ribbon including a temporary backing, a magnetic coating comprising ferromagnetic particles uniformly dispersed in a binder and an adhesive layer overlying said magnetic coating, said adhesive being adapted to adhere more tenaciously to said motion picture film and to said binder than said binder adheres to said temporary backing, which comprises conducting the transfer ribbon and motion picture film at the same rate of travel in converging paths until the adhesive-coated surface of the transfer ribbon is in contact with an edge portion of the motion picture film, pressing the contacting portions of said motion picture film and transfer ribbon together, maintaining the transfer ribbon and motion picture film in contact until the adhesive has set sufficiently to hold the magnetic coating upon the motion picture film upon removal of the temporary backing, and then separating the temporary backing from the transfer ribbon and motion picture film to cause the magnetic coating to be transferred from the former to the latter.

2. A method of coating magnetic particles on motion picture film, adjacent an edge thereof, which comprises bringing a strip of motion picture film and a transfer tape including a temporary flexible backing, a magnetic coating comprising magnetic particles uniformly dispersed in a binder and an overlying adhesive coating, said adhesive being adapted to adhere more tenaciously to said motion picture film and to said binder than said binder adheres to said temporary backing, to a nip from different directions, pressing said film and said tape together, moving said tape and said film in a common path until the adhesive has set sufficiently to hold the magnetic particles on the motion picture film upon removal of the temporary backing, and then separating the backing from the lamination, leaving the magnetic coating secured to the edge of the motion picture film and having smooth exposed surface.

3. A method of coating magnetic particles on the edge of motion picture film between the sprocket holes and adjacent edge from a transfer ribbon of a width greater than the distance between the sprocket holes and adjacent edge of said motion picture film and including a temporary flexible backing, a layer of magnetic particles uniformly dispersed in a binder and an overlying layer of a heat-sensitive adhesive, said adhesive being adapted to adhere more tenaciously to said motion picture film than said binder adheres to said temporary backing, which comprises continuously bringing the motion picture film and transfer ribbon to a nip from different directions with a portion of the transfer ribbon in contact with the motion picture film between the sprocket holes and adjacent edge thereof, heating said transfer ribbon just before it reaches said nip, pressing the contacting portions of said ribbon and film together, moving said ribbon and film in a common path until the adhesive has set sufficiently to hold the magnetic particles on the motion picture film, slitting the portion of the transfer ribbon that is not bonded to said film, and then removing the temporary backing leaving the magnetic particles secured to the edge of the motion picture film and having a smooth exposed surface.

4. Apparatus for continuously transferring magnetic particles from a carrier ribbon to the edge portion of motion picture film, said carrier ribbon including a flexible backing, a layer of magnetic particles and a heat-activated adhesive overlying said layer; which comprises supply reels upon which said motion picture film and carrier ribbon are mounted, means for guiding said film and ribbon in converging paths and at the same speed, means for heating the adhesive on said carrier ribbon, a presser roll cooperating with said heating means to press the adhesive-coated surface of the carrier ribbon against an edge portion of said motion picture film, guide means for conducting the lamination of carrier ribbon and motion picture film together until the heat-activated adhesive has hardened upon said motion picture film, and slitting means for trimming away the unlaminated portion of said carrier ribbon.

5. Apparatus for continuously transferring magnetic particles from a carrier ribbon to motion picture film between the sprocket holes and the edge of the film, said carrier ribbon being wider than the distance between the sprocket holes and the edge of the film and including a temporary flexible backing, a layer of magnetic particles and a heat-sensitive adhesive overlying said layer, said adhesive being adapted to adhere more tenaciously to said motion picture film than to said temporary backing; which comprises means for guiding the motion picture film and carrier ribbon at the same rate of speed in converging paths, guide means over which the carrier ribbon is drawn, means for heating said guide means, a pressure roller cooperating with said guide member adapted to press the adhesive-coated surface of the carrier ribbon against the motion picture film between the sprocket holes and edge thereof, guide means for conducting the lamination of carrier ribbon and motion picture film in a common path until the adhesive has set upon the motion picture film, means for slitting the portion of said carrier ribbon that is not adhered to the motion picture film, and means for stripping the temporary backing from the lamination of carrier ribbon and motion picture film, thereby securing the magnetic layer to the motion picture film between its edge and sprocket holes.

ANDREW H. PERSOON.
CHESTER F. STEBBINS.

REFERENCES CITED

The following references are of record in the file of this patent:

UNITED STATES PATENTS

| Number | Name | Date |
|---|---|---|
| 403,295 | Segal | May 14, 1889 |
| 414,689 | Edwards | Nov. 12, 1889 |
| 742,807 | Tharp | Oct. 27, 1903 |
| 813,564 | Markus | Feb. 27, 1906 |
| 1,515,676 | Grupe | Nov. 18, 1924 |
| 1,540,862 | Punnett | June 9, 1925 |
| 1,883,559 | Chipman | Oct. 18, 1932 |
| 1,883,562 | Chipman et al. | Oct. 18, 1932 |
| 1,885,388 | Taylor et al. | Nov. 1, 1932 |
| 1,903,981 | Coffman | Apr. 18, 1933 |
| 1,912,887 | Chipman | June 6, 1933 |
| 1,922,852 | Humphrey | Aug. 15, 1933 |
| 2,008,763 | Lawrence et al. | July 23, 1935 |
| 2,376,922 | King | May 29, 1945 |
| 2,407,549 | Gurwick | Sept. 10, 1946 |
| 2,463,244 | Carter | Mar. 1, 1949 |
| 2,548,872 | Cross et al. | Apr. 17, 1951 |

FOREIGN PATENTS

| Number | Country | Date |
|---|---|---|
| 324,099 | Great Britain | Jan. 17, 1930 |
| 459,884 | Great Britain | Jan. 18, 1937 |
| 466,023 | Great Britain | May 18, 1937 |